United States Patent Office 3,546,208
Patented Dec. 8, 1970

3,546,208
PROSCILLARIDIN KETALS
Walter Steidle, Limburgerhof, Germany, assignor to Knoll A.G. Chemische Fabriken, Ludwigshafen (Rhine), Germany
No Drawing. Filed July 27, 1967, Ser. No. 656,356.
Claims priority, application Germany, July 27, 1966, 1,568,924
Int. Cl. C07c *173/00*
U.S. Cl. 260—210.5                                     10 Claims

ABSTRACT OF THE DISCLOSURE

Di-lower alkyl and cycloalkyl ketal derivatives of proscillaridin having significantly higher enteral resorption coefficient upon oral administration than unaltered proscillaridin, and the preparation thereof.

---

This invention relates to proscillaridin ketals that possess the positive inotropic activity and desirable dissipation rate of proscillaridin disclosed in copending application Ser. No. 408,469, now U.S. Pat. 3,361,630, and in addition have the advantage of a significantly higher enteral resorption rate upon oral administration, as well as to the preparation thereof.

The ketals of the invention are compounds of the formula

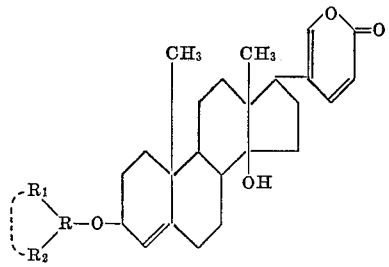

in which R is a rhamnose residual $C_7H_9O_4$ containing the group

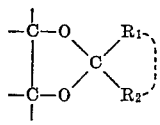

and in which $R_1$ and $R_2$ individually are low molecular weight alkyl having a total of up to seven carbon atoms or, together, are alkylene of four to six carbon atoms.

The enteral resorption coefficient, after oral administration, of the proscillaridin described in U.S. Pat. 3,361,630 is about 35%. In order to accelerate the speed with which this glycoside takes effect after oral administration, a most important factor in the treatment of a cardiac insufficiency, various efforts have been made to alter the structure of the molecule so that it will be absorbed more rapidly in the blood stream.

Inasmuch as Megges and Repke, in "Naunyn-Schmiedeberg's Archiv f. Experimentelle Pathologie u. Pharmakologie," vol. 241 (1961), page 534, reported an increased rate of resorption of gitoxin after esterification of the hydroxyl groups with acetic acid, it was thought that the resorption rate of proscillaridin could be similarly increased. Unfortunately, the inotropic activity of proscillaridin triacetate is reduced to such an extent as to make it impractical as a means for treating a cardiac insufficiency.

The surprising discovery has now been made that the enteral resorption rate of proscillaridin can be doubled without undue loss of positive inotropic activity by reaction thereof with a dialkyl ketone of three to eight carbon atoms, or with a cycloalkyl ketone of five to seven carbon atoms to produce the corresponding ketal. This is surprising in view of the finding, by Lingner et al., "Arzneimittel Forschung," vol. 13 (1963), pages 142–149, that the ketalization of strophanthin, which is similar to proscillaridin, causes very extensive reduction in activity.

Comparisons between proscillaridin and the acetonide or dimethyl ketal thereof, and the triacetate are apparent from Table 1:

TABLE 1

|  | Toxicity in Guinea Pig intrav., mg./kg. | Toxicity in Cat, intrav., mg./kg. | Enteral resorption, in Cat, percent |
|---|---|---|---|
| Proscillaridin | 0.447 | 0.214 | 34 |
| Proscillaridin acetonide | 0.445 | 0.429 | 77 |
| Proscillaridin triacetate | 3.5 | | |

The two-fold more rapid resorption of the acetonide is of greatest significance because of the overriding importance of rapid effect after oral administration. This is much more significant than the higher toxicity, which is balanced by the fact that the dosage of the acetonide need be no more than half the dosage of proscillaridin per se.

To prepare a proscillaridin ketal in accordance with the invention, a pure proscillaridin, preferably prepared as described in U.S. Pat. 3,361,630, is reacted with a dialkyl ketone such as acetone, diethyl ketone, dibutyl ketone, or with a cyclic ketone such as cyclohexanone, at room temperature or at an elevated temperature up to about the boiling point of the ketone reactant at a pH below 7, i.e., in the presence of a mineral or organic acid, or in the presence of a salt of a weak base and a strong acid, e.g., a Friedel-Crafts salt such as cupric sulfate of zinc chloride.

The proscillaridin is stable at such elevated temperatures and is slightly soluble in the ketone reactant. While the solubility of unreacted proscillaridin in ketone is minimal, e.g., approximately 1% in acetone, the amount of unreacted proscillaridin dissolved at any given moment is always sufficient to make the reaction operably rapid.

It is desirable to end the reaction as soon as it is completed in order to minimize formation of undesirable by-products. The unreacted proscillaridin can readily be removed by filtration over silica gel and thus recovered quantitatively. The use, initially, of pure proscillaridin is not mandatory because impurities do not interfere with the reaction and can readily be separated from the proscillaridin ketal that is formed.

The reaction of proscillaridin with acetone in the presence of dilute mineral acid takes place rapidly. For example, with 0.1 N hydrochloric acid, the reaction is completed within ten minutes, 15% decomposition products being formed and about 20% proscillaridin remaining unreacted. With 0.02 N hydrochloric acid, it takes 60 to 80 minutes to achieve equilibrium conditions with a yield of about 80% acetonide, 10% unreacted proscillaridin and 10% decomposition products.

The concentration of proscillaridin in the course of the reaction has only a minimal effect on the reaction. It is advantageous to carry out the reaction with an excess of ketone so that the excess ketone will function as a solvent, particularly for the proscillaridin ketal reaction product. This is demonstrated in Table 2 showing the yields obtained by reacting various concentrations of proscillaridin in acetone for one hour at room temperature in the presence of 0.05 N hydrochloric acid.

TABLE 2

| Initial solution [1]: | Yield of acetonide, percent | Unreacted proscillaridin recovered, percent | Decomposition products, percent |
|---|---|---|---|
| 0.1 | 71.5 | 9.5 | 19 |
| 1 | 61 | 10.5 | 18.5 |
| 5 | 69 | 14 | 17 |
| 10 | 67 | 22 | 11 |

[1] Proscillaridin in Acetone, g./ml.

The reaction proceeds considerably more slowly in the presence of cupric sulfate, but it has the advantage of resulting in a reduced yield of by-products. The use of zinc chloride instead of acid reduces the speed of reaction even further.

The working up of the reaction mixtures involves no difficulties. The ketone solution is poured on ice, neutralized with alkali metal hydroxide and extracted with ethyl acetate or other suitable solvent, such as chloroform or toluene. The solution is evaporated after washing and drying. To remove by-products it is dissolved in a suitable solvent such as chloroform or toluene and filtered through ten times its volume of silica gel. Unreacted proscillaridin that is still present is then eluted with methanol. This is obtained in such a pure state that it is available immediately for further reaction.

A particularly simple form of reaction involves filling a column with cupric sulfate and running through it a solution of proscillaridin in the ketone with which it is to be reacted. The ketone solution that leaves at the bottom is filtered through silica gel to separate unreacted proscillaridin.

EXAMPLE 1

(A) 10 g. proscillaridin are added, while stirring, to a mixture of 100 ml. acetone and 0.2 ml. 10 N hydrochloric acid. At room temperature the proscillaridin dissolves completely in about twenty to thirty minutes. Ninety minutes after commencement of the reaction, the clear solution is poured into 20 g. ice, stirred with 2 ml. 1 N sodium hydroxide, and the neutral solution is extracted three times, each time with 100 ml. ethyl acetate. The three extracts are combined, washed with a small amount of water, dried with sodium sulfate, and the solvent is evaporated under vacuum. 10 to 11 g. residuum are obtained, consisting of 80% proscillaridin-acetonide, 10% unreacted proscillaridin, and 10% by-products, which include scillaridin, scillarenin and the acetonide of a companion glycoside.

The residuum is dissolved in a little acetone, mixed with an equal quantity of toluene, and chromatographed in a 100 g. column of silica gel. Elution is carried out with toluene. The acetonide-containing fractions are separated and evaporated under vacuum. A very pure product is obtained by recrystallization of the proscillaridin-acetonide. Melting point, 191° C. (from ethyl acetate/hexane) 141° C. (from methanol). Maximum absorption $\alpha$ at 355 m$\mu$=80. $[\alpha]_D^{20}$=—58° in methanol.

(B) The same product is obtainable by stirring, for 24 hours at room temperature, 10 g. proscillaridin into 400 ml. acetone containing 40 g. anhydrous cupric sulfate. After filtration of the copper sulfate and evaporation of the solvent under vacuum, the procedure corresponds to that of Example 1A. The yield of crude product is 10 to 12 g. The physical properties of the acetonide correspond to those of Example 1A.

(C) The same results are obtainable by slowly passing a solution of proscillaridin in acetone (0.5% g./ml.) over a column filled with a mixture of 130 g. cupric sulfate and 500 g. sand. The effluent solution is filtered, evaporated and worked up as described in Example 1A.

EXAMPLE 2

By following the procedure of Example 1B with 6 g. proscillaridin and a mixture of 120 ml. dioxane and 120 ml. dibutylketone containing 30 g. cupric sulfate, the corresponding dibutyl ketal is obtainable. Melting point 185–187° C. (from ethyl acetate/hexane). Maximum absorption $\alpha$ at 355 m$\mu$=71. $[\alpha]_D^{20}$=—53°.

EXAMPLE 3

By following the procedure of Example 1A with proscillaridin and diethylketone, the corresponding diethylketal is obtainable. Melting point 127–128° C. (from ethyl acetate/hexane). Maximum absorption $\alpha$ at 355 m$\mu$=71. $[\alpha]_D^{20}$=—53°.

EXAMPLE 4

By following the same procedure with cyclohexanone, the corresponding proscillaridin ketal is obtainable. Melting point 140° C. (from ether/hexane). Maximum absorption $\alpha$ at 355 m$\mu$=73. $[\alpha]_D^{20}$=—62°.

I claim:
1. A compound of the formula

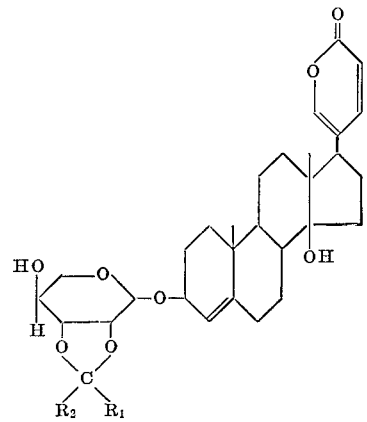

wherein $R_1$ and $R_2$ are lower alkyl or, together with each other and the carbon atom to which they are attached, a 5- or 7-membered alicyclic ring.

2. The compound of claim 1 wherein $R_1$ and $R_2$ are both methyl.

3. The compound of claim 1 wherein $R_1$ and $R_2$ are both butyl.

4. The compound of claim 1 wherein $R_1$ and $R_2$ are both ethyl.

5. The compound of claim 1 wherein $R_1$ and $R_2$ together are pentamethylene.

6. A method for preparing the compound of claim 1 which comprises reacting proscillaridin with an aliphatic ketone having a total of up to eight carbon atoms or a cycloaliphatic ketone of five to seven carbon atoms at a pH below 7 or in the presence of a salt of a weak base and a strong acid.

7. A method as defined in claim 6 wherein the reaction is carried out in excess ketone as solvent and at room temperature.

8. A method as defined in claim 6 wherein the reaction is carried out in the presence of a mineral acid.

9. A method as defined in claim 8 wherein the acid is hydrochloric acid.

10. A method as defined in claim 6 wherein the reaction is carried out in the presence of cupric sulfate of zinc chloride.

References Cited

UNITED STATES PATENTS 3,361,630   1/1968   Steidle _____ 260—210.5
3,471,470   10/1969  Heider et al. _____ 260—210.5

OTHER REFERENCES

Pigman: "The Carbohydrates," Academic Press Inc., 1957, New York, N.Y., pp. 229–232 and 236–239.

LEWIS GOTTS, Primary Examiner

J. R. BROWN, Assistant Examiner

U.S. Cl. X.R.

424—182